No. 766,618. PATENTED AUG. 2, 1904.
J. HEINRICHS.
BURNER.
APPLICATION FILED OCT. 14, 1903.
NO MODEL.

WITNESSES:
Gd M Taylor
Isaac B. Owens

INVENTOR
Joseph Heinrichs
BY Munn & Co
ATTORNEYS.

No. 766,618. Patented August 2, 1904.

UNITED STATES PATENT OFFICE.

JOSEPH HEINRICHS, OF NEW YORK, N. Y.

BURNER.

SPECIFICATION forming part of Letters Patent No. 766,618, dated August 2, 1904.

Application filed October 14, 1903. Serial No. 176,987. (No model.)

*To all whom it may concern:*

Be it known that I, JOSEPH HEINRICHS, a citizen of the United States, and a resident of the city of New York, borough of Manhattan, in the county and State of New York, have invented a new and Improved Burner, of which the following is a full, clear, and exact description.

This invention relates to a burner for volatile combustible liquids, notably for alcohol.

The object of the invention is to increase the heat of the burner with a given amount of fuel and to provide a burner which will operate from generated gas with perfect safety and which may be regulated easily and effectively. This end I attain by providing a receptacle for the liquid fuel preferably containing a non-combustible absorbent and a chamber communicating with the receptacle. Adjacent to said chamber is a combustion-space, and vapor-discharge orifices are formed in the wall surrounding the combustion-space, the combustion-space being also in communication with the fuel-reservoir, so that as the vapor rises directly from the reservoir into the combustion-space it is met by jets of vapor passing under pressure horizontally from the chamber, and the vapor may be burned in the combustion-space with better effect than in case it were allowed merely to rise from the fuel-reservoir. With this construction it is impossible for the vapor in the chamber to explode or the liquid escape should the lamp be upset, since the gas of combustion from the gas-chamber or the liquid will find easy outlet through the absorbent material, and thence into the combustion-space of the burner, which is open to the atmosphere. I also provide a peculiarly-constructed cover for the combustion-space by which the consumption of fuel, and hence the heat of the burner, may be easily and properly regulated.

This specification is an exact description of one example of my invention, while the claims define the actual scope thereof.

Reference is to be had to the accompanying drawings, forming a part of this specification, in which similar characters of reference indicate corresponding parts in both views.

Figure 1:
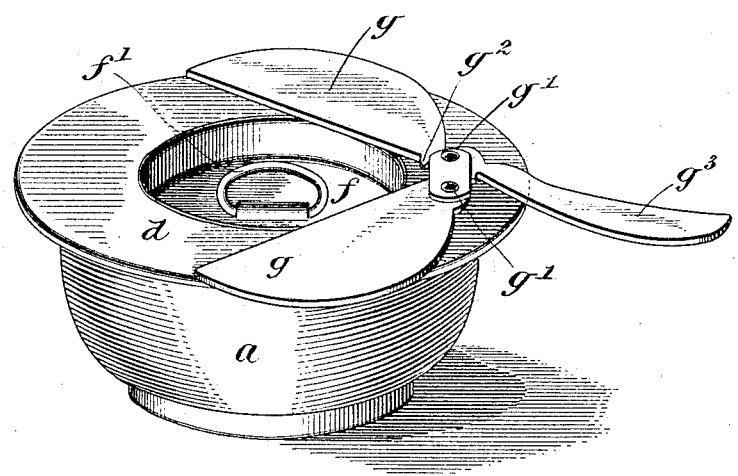
Figure 2:
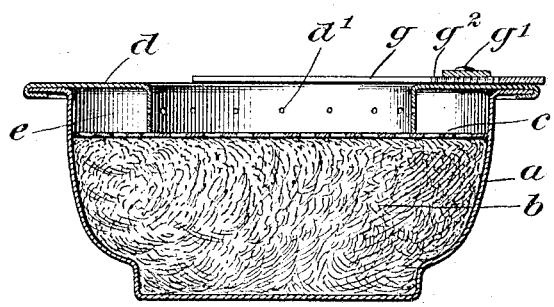

Figure 1 is a perspective view of a form of the invention adapted especially for household use in heating small cooking and other utensils, and Fig. 2 is a vertical section thereof.

The burner may be constructed of any suitable material—for example, of sheet-copper— and it comprises the bowl or fuel-receptacle $a$, containing, preferably, a mass of absorbent non-combustible material $b$. According to the form of invention here illustrated a screen or perforate plate $c$ is placed over the top of the fuel-receptacle $a$, and over the outer portions of this screen are arranged walls $d$, forming an annular vapor-chamber $e$. Said walls $d$ have perforations $d'$ in their vertical portions, which discharge into the central combustion-space surrounded by said walls.

The vapor rising from the liquid fuel in the receptacle $a$ passes through the middle portion of the screen $c$ up into the combustion-space and is there burned. The vapor also rises into the chamber $e$ and accumulates therein, where it is heated and discharged under pressure horizontally through the perforations $d'$. This vapor from the vapor-chamber mingles with the vapor rising directly into the combustion-space, and all of the vapor burns together. It will be observed that since the vapor accumulates in the chamber $e$ and is heated therein it issues from the openings $d'$ in highly-combustible form and will burn with increased intensity. Since the combustion-space is open to the atmosphere during the operation of the burner, there is no danger of an explosion of the vapor either in the bowl $a$ or chamber $e$.

$f$ indicates a stopper formed, preferably, of sheet metal, with a finger-ring $f'$ in its center, this stopper being arranged to fit snugly within the combustion-space and to close the perforations $d'$, as well as to cover the whole of the exposed portion of the perforated plate or screen $c$. This stopper is employed when the burner is not in use and prevents loss of fuel by evaporation.

A cover is provided, consisting of two sections $g$, mounted to swing toward and from each other on the adjacent pivots $g'$, and said sections have gear-segments $g^2$ formed thereon and meshing together, so that the movement of one section into active or inactive position is necessarily followed by a corresponding movement of the other section. $g^3$ indicates a handle or finger-piece attached to one of the cover-sections. This cover allows the burner to be regulated, as before explained.

In using the invention the alcohol or other liquid fuel should be poured into the receptacle $a$ until the asbestos $b$ is saturated therewith. The fumes then rising through the plate or screen $c$ into the combustion-space may be lighted, and this will be reinforced by the gas or vapor which passes under pressure from the chamber $e$. The flame may be extinguished by applying the stopper $f$ and regulated by adjusting the cover members $g$.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A burner comprising a receptacle for the liquid fuel, and walls forming a vapor-chamber, the vapor-chamber communicating with said receptacle, a horizontally-disposed foraminous partition separating the vapor-chamber from the receptacle, said chamber and receptacle each having outlets into a combustion-space.

2. A burner for liquid fuels, having a fuel-receptacle with an outlet therefrom to the atmosphere, and walls forming a vapor-chamber or inclosure communicating with said receptacle and located directly adjacent thereto and having a discharge-orifice juxtaposed to the said discharge-orifice of the receptacle, whereby as the vapor from the receptacle burns, the vapor in the said vapor-chamber is heated and the heated vapor discharged into the vapor passing directly from the receptacle to increase the heat of the flame.

3. A burner, having a receptacle for the liquid fuel, a foraminated cover for the receptacle, and walls forming a chamber above and communicating with said receptacle, and having an outlet adjacent to said foraminated cover.

4. A burner having a bowl forming a receptacle for the liquid fuel, a vapor-chamber, and a foraminated cover for the receptacle, dividing the latter from the vapor-chamber, the said vapor-chamber communicating with the interior of the bowl, and having an outlet adjacent to said foraminated cover.

5. A burner, having a bowl forming a receptacle for the liquid fuel, a foraminated cover for the same, walls extending around the edges of the bowl and forming a chamber communicating with the interior of the bowl and having an outlet adjacent to said foraminated cover, and a stopper capable of fitting over said foraminated cover to close the same and the said outlet of the chamber.

6. A burner, having a bowl forming a receptacle for the liquid fuel, a foraminated cover for the same, walls extending around the edges of the bowl and forming a chamber communicating with the interior of the bowl and having an outlet adjacent to said foraminated cover, and a cover mounted on said walls forming the chamber, and formed of two parts having a connection with each other to cause said parts to move simultaneously toward and from each other.

In testimony whereof I have signed my name to this specification in the presence of two subscribing witnesses.

JOSEPH HEINRICHS.

Witnesses:
RICHARD B. CAVANAGH,
EVERARD B. MARSHALL.